G. H. STEWART.
CAN SOLDERING MACHINE.
APPLICATION FILED MAY 28, 1907.

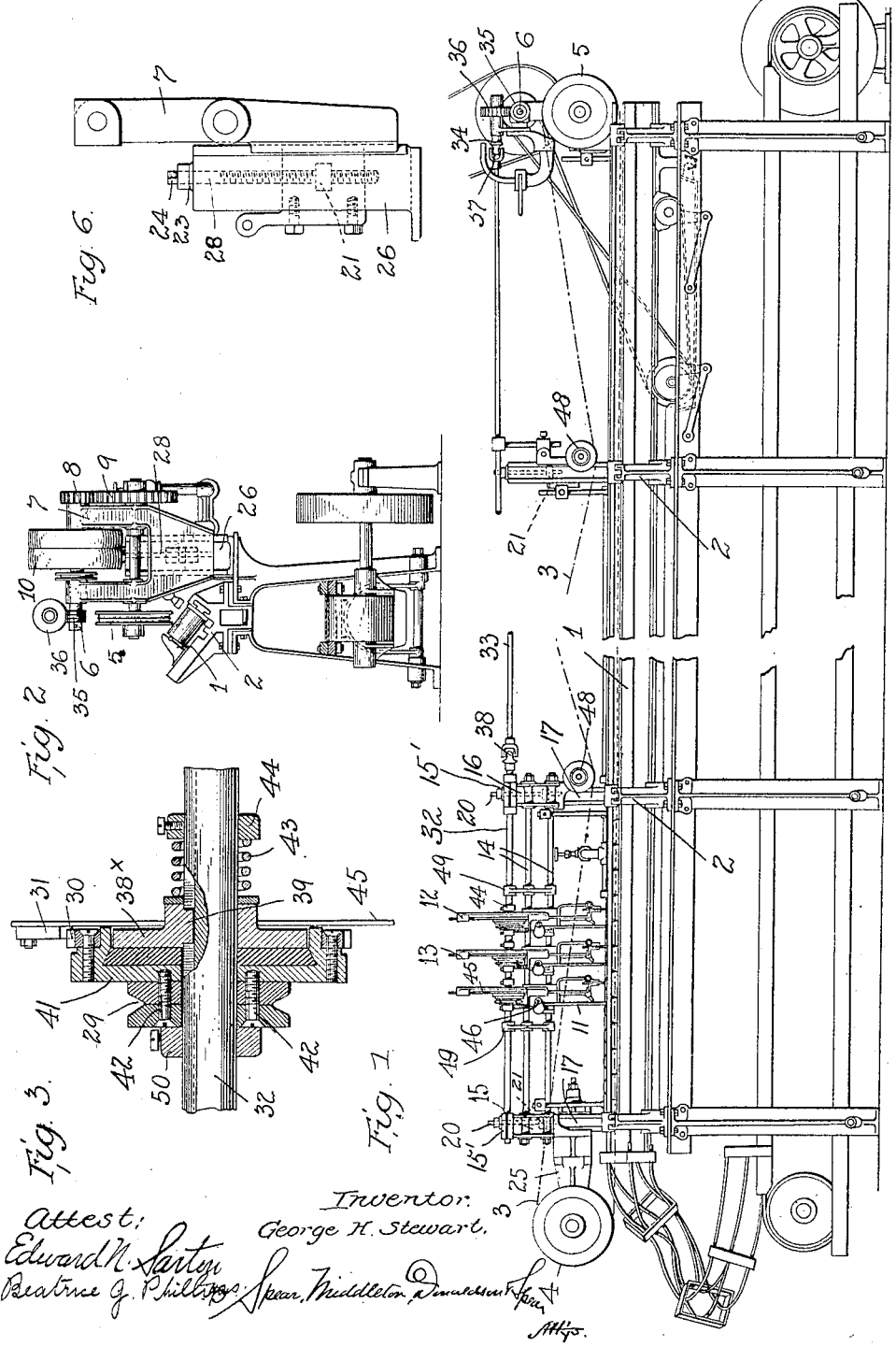

926,618.

Patented June 29, 1909.
2 SHEETS—SHEET 2.

Attest:
E. N. Sarton
Beatrice G. Phillips

Inventor
George H. Stewart
By Spear, Middleton, Donaldson & Spear
Att'ys.

UNITED STATES PATENT OFFICE.

GEORGE H. STEWART, OF LOS ANGELES, CALIFORNIA.

CAN-SOLDERING MACHINE.

No. 926,618.  Specification of Letters Patent.  Patented June 29, 1909.

Application filed May 28, 1907. Serial No. 376,175.

*To all whom it may concern:*

Be it known that I, GEORGE H. STEWART, a citizen of the United States, residing at Los Angeles, California, have invented certain new and useful Improvements in Can-Soldering Machines, of which the following is a specification.

My invention is an improvement in can soldering machines of the type shown for instance in Letters Patent of the United States granted to me July 11, 1905, #794692.

My present improvement concerns particularly the driving connections for the soldering element or elements and means of adjustment whereby the machine is adapted to solder cans of different diameters. In the machine disclosed in the said patent, the cans are rolled along a way or trough by means of a flexible chain or like means traveling along the way or trough and bearing upon the cans resting thereon so as to roll them from end to end of the said way and past the soldering units or elements.

In my present machine I employ a plurality of soldering units, though I may use one or more such units, and I provide means whereby the said soldering units may be adjusted vertically toward and from the way or trough to suit the different diameters of cans, and at the same time the said soldering units maintain their operative connection with the means for driving the rotary feed members for the solder. I also provide means whereby the chain for rolling the cans along the way or trough may be adjusted to suit different sizes of cans.

Figure 4:
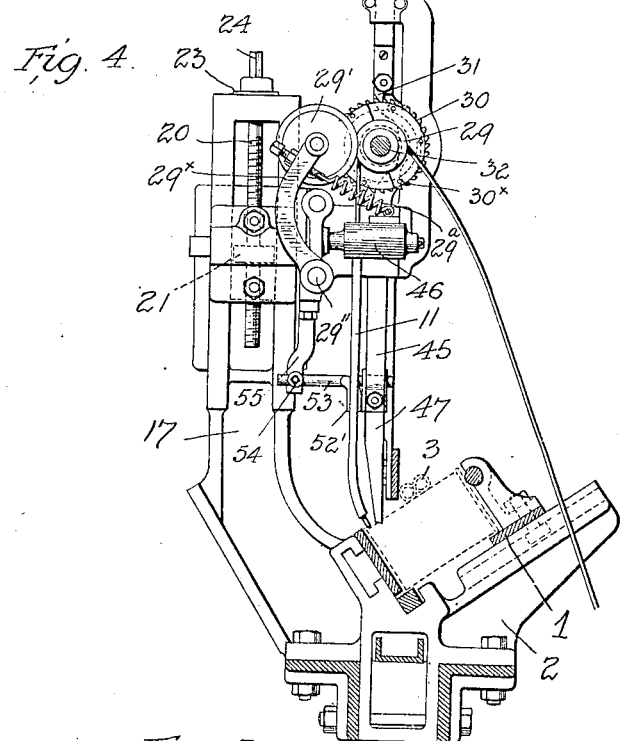
Figure 5:
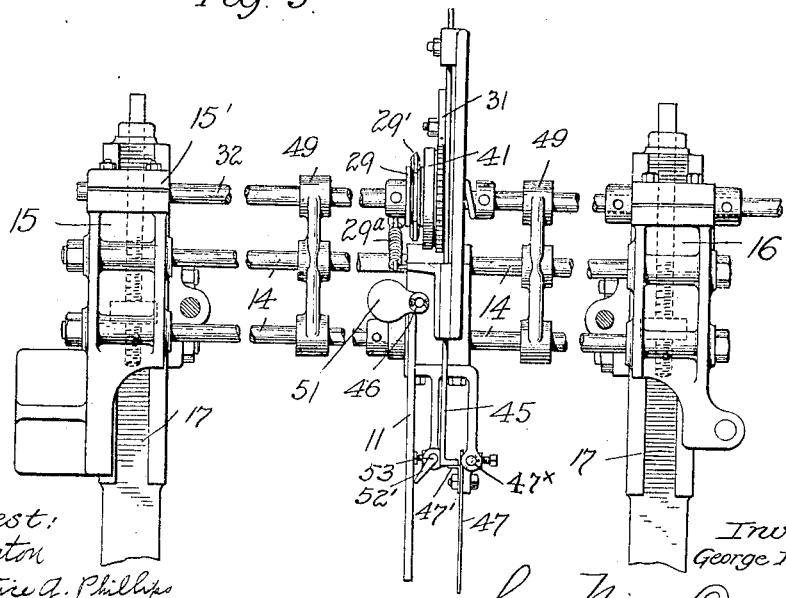

In the accompanying drawings, Figure 1 is a front view of a machine embodying my improvements. Fig. 2 is an end view of the machine. Fig. 3 is a detail view of the solder feed disks or wheels and the parts associated therewith. Fig. 4 is an enlarged view of one of the solder feeding elements in its relation to the can trough and can. Fig. 5 is a front view similar to Fig. 1 showing one of the soldering units or elements and means for supporting the same. Fig. 6 is a view of one of the supporting posts and bracket adjustable thereon.

In these drawings, 1, represents the way or trough upon which the cans are rolled or trough from end to end, said trough or way along being supported upon a suitable frame work as at 2. This way or trough holds the cans in inclined position as they are rolled along it, and thus presents the end seam to the soldering devices. For rolling the cans along the trough, I employ as in the patent referred to, a flexible member as a chain 3, which passes around directing wheels 4—5, the latter of which is driven from a shaft 6, journaled in a bracket 7, the said shaft having a pinion 8 thereon meshing with the gear wheel 9 on the shaft of the wheel 5. The shaft 6 has thereon a belt wheel 10, which is driven through a belt from any suitable source of power. The soldering units represented generally at 12, 13, are supported upon a frame work consisting of rods or bars 14, extending between brackets 15—16, which are in turn supported upon posts or standards 17 of the frame. An adjusting screw 20 extends down through the post and into a nut 21 on the bracket. The adjusting screw 20 at its upper end is provided with a flange 23 resting on the upper end of the post and said screw is also provided with a rectangular head 24 adapted to receive a wrench whereby the screw may be turned. It will now be seen that the brackets carrying the supporting rods or bars 14 may be raised or lowered by turning the screws 20. By this means the whole gang of soldering elements or units may be adjusted at one operation to suit different diameters of cans. Within certain limits of adjustment the flexibility of the chain will automatically adapt itself to different sizes of cans, but I have provided means whereby the chain also may be adjusted for different sizes of cans. For this purpose I support the chain wheel 4 upon an arm 25 secured to the bracket 15.

The chain supporting and directing wheel 5 is journaled as before stated in the bracket 7, and this bracket may be adjusted as a whole upon its supporting post 26 by turning the adjusting screw 28.

As in the patent above referred to, each soldering unit comprises a feed wheel or disk 29 coöperating with another wheel 29' to engage and feed the solder wire downwardly and a toothed wheel 30 coöperating with a pawl or detent 31 for controlling the feed. In the present case I arrange the feed wheel and the toothed wheel side by side upon a shaft 32 which has its bearings in the extensions 15' of the brackets 15—16 above described, and this shaft I drive by a flexible shafting 33—34 from the shaft 6, through a worm 35 and worm wheel 36. The universal coupling between the flexible shaft sections 33—34 is indicated at 37, and a like coupling is employed at 38 between the shaft section 33 and the feed shaft 32.

In my present machine, like that disclosed in the patent aforesaid, I employ a friction drive between the driving shaft and the solder feeding wheel. This consists in the present case of a disk $38^\times$ splined as at 39 to the shaft 32 and bearing upon a filling of Babbitt metal, carried by a disk 41 loose on the shaft 32 to which is connected solder feeding wheel 29 by screws 42. The friction drive disk 38 is pressed against the disk 41 or against the Babbitt metal carried thereby by a spring 43 bearing at one end against a collar 44 fixed on the shaft. The disk 41 carries the toothed rim or wheel 30 with which the detent 31 coöperates. When no can is passing the solder feeding device the detent 31 is in its lowermost position engaging the toothed rim 30 and the rotation of the shaft 32 will therefore have no effect in feeding solder as the friction disk 38 will simply turn against the face of disk 41 without moving the same because said disk is held by the detent 31, but upon the arrival of a can at the proper point for soldering the bar or rod 45 carrying the said detent 31 will be lifted, thus freeing the toothed rim and the disk 41, whereupon the same is rotated by its frictional contact with the constantly rotating friction disk 38 and the solder feed wheel 29 partaking also of this movement will feed the solder to the can through a suitable solder directing tube 11, which in this case I pivotally support at the point 46 so that the lower end of the solder may have a lateral movement by reason of the swinging of the solder tube and thus follow up the movement of the can in passing the solder point. The wheel 29' above mentioned serves to press the solder wire against the feed wheel 29, it being carried by an arm $29^\times$ pivoted at 29'' and under tension of a spring $29^a$.

The rod 45 carrying the detent 31 is raised by an angularly shaped lever 47 suitably pivoted at $47^\times$ and having its short arm 47' engaging the lower end of the rod 45 and having its long arm extending into the path traveled by the can so as to contact with the can body and thus control the solder feeding action by the presence of the can and when said can arrives at the proper point.

With my present arrangement in which the driving shaft 32 extends lengthwise of the way or trough for the cans, it will be noticed that I can employ any desired number of sets of these solder feeding devices or units. They can be arranged so that one after the other will feed solder to the can, and in adjusting the machine for different sizes of cans all of the units will be adjusted vertically at the one operation. The chain for moving the cans along the way may be under any suitable number of idlers as at 48. The rods or frame bars 14 may be provided with any suitable stay brackets 49 for giving stiffness to the frame work for supporting the soldering devices, and these stay pieces 49 may also have bearings for the shaft 32. It will be observed that the solder feeding units may be adjusted vertically without disturbing the connection between the shaft 32 and the driving means for the reason that this connection comprises the flexible shafting 33—34.

The toothed wheel 30, it will be noticed from Fig. 4, is formed in sections so that these sections by removing the screws $30^\times$ can be removed from the machine without dismantling any of the mechanism. This construction is for the purpose of enabling wheels having differently spaced teeth to be used so as to vary the extent of feed of the solder. By this the feed can be made to suit different sizes of cans or different conditions, for it will be understood that the spaces between the teeth control in a measure the amount of solder fed. With widely spaced teeth when the detent 31 is lowered to engage the toothed wheel the feeding movement will continue until the tooth arrives in contact with the detent, and of course with teeth arranged close together this contact will take place sooner than with widely spaced teeth, and consequently the feeding action will be stopped sooner with the closely spaced teeth than with the widely spaced teeth.

Reverting to the solder applying units these are located on the shaft 32 between collars 50, 44, adjustably fixed on the shaft by set screws as shown in Figs. 1 and 3. By this arrangement the units may be spread apart more or less along the shaft 32 to secure the application of feeds of solder in proportion to the lengths of seams, or in other words in proportion to the circumference of the cans.

The solder being melted by the heat previously applied to the can it is clear that the heat for melting is extracted or conducted from a very small area of the metal of the can and therefore it is possible should an excessive feed of solder be taking place to overtax the melting power of the heated can body, resulting in imperfect soldering. With my battery of units, however, adjusted along the shaft 32 to suit the size of the cans, I am enabled to increase indefinitely and properly locate the number of feeds and thus reduce the demand, at each point of contact of the solder, for heat from the surrounding area or substance to melt solder. It will be clear for instance that the heat in any square inch of can area with the heat at a safe degree will melt just so much solder, and no more. If the heat is increased the can is burned. If solder is forced upon the can in excess of that which the heat in the metal can take care of, it of course will not melt. With my present improvement I can subdivide the amount of solder for the seam into as many portions as are required for perfect work so that the heat units in each area from which the heat is conducted for soldering will have only, say, one-half, one-third, or one-fourth, as the case may be, of the work to do.

By employing a pivoted solder feed tube the contacting end of the solder wire follows up in a measure the traveling movement of the can, thus preventing frictional resistance and maintaining contact for a sufficient length of time for the proper melting effect on the solder. The solder feed tube is returned to normal position by a weight 51 and an adjustable stop limits the retracting movement of the said tube. This adjustable stop consists of a finger 52' carried by a rod 53 adjustably held by a set screw 54 in an arm 55, of the frame work.

I do not limit myself to a pivotally mounted solder feed tube, as it may be arranged in other ways to follow up the movement of each can for a certain distance and then move back, so as to act in connection with the next can as it comes along. Any form of reciprocating or oscillating solder applying device, therefore, is within the scope of my invention.

I claim as my invention:—

1. In combination in a can soldering machine, a way upon which the cans are supported and along which they are rolled, said way being capable of receiving cans of different diameters, solder feeding devices to feed the wire solder into direct contact with the cans, and means whereby the soldering devices may be adjusted vertically in relation to the way to suit cans of different diameters, substantially as described.

2. In combination in a can soldering machine, a way along which the cans are rolled and capable of receiving cans of different sizes, a flexible member bearing on the cans for moving them along the way, solder feeding means past which the cans are rolled and which feeding means directs the solder wire in contact with the cans, and means for adjusting the soldering means vertically to suit cans of different diameters, substantially as described.

3. In combination in a machine for soldering the end seams of cans, a way along which the cans are rolled, a plurality of soldering units arranged successively to apply solder to the can, means for moving the cans along the way, and means for adjusting in unison the plurality of solder applying units, substantially as described.

4. In combination in a machine for soldering the end seams of cans, a plurality of solder applying units for successively applying the solder to the same seam of the can, means for moving the cans past the said plurality of solder applying units, and means for adjusting the said plurality of solder applying units in unison toward and from the cans, substantially as described.

5. In combination, solder applying means including solder feeding devices, a support along which the cans are moved, a shaft for driving the solder applying means, said shaft extending lengthwise of the said support, means for adjusting the said shaft and the solder applying means toward and from the support, and flexible shafting for driving the said shaft, substantially as described.

6. In combination in a machine for applying solder to the end seams of cans, a way along which the cans are moved, solder applying means, including a solder feeding device, a shaft extending lengthwise of the support for the cans and in driving connection with the solder applying means, a flexible member for moving the cans along the support, a driving wheel for the said flexible member, a driving pulley, shafting connected flexibly with the solder feeding shaft, gearing between the pulley and the said shafting and gearing between the said pulley and the drive wheel of the flexible member, substantially as described.

7. In combination, a way along which the cans are moved to be soldered, solder feed means including a solder feeding member, a chain for rolling the cans along the way, a shaft for driving the solder feeding member, said shaft extending longitudinally of the way, flexible shafting also extending longitudinally of the way for driving the solder feeding shaft, means for adjusting the solder feeding shaft vertically, and means for driving the chain, substantially as described.

8. In combination in a can end seam soldering machine, a way along which the cans are moved, solder applying means, a chain for rolling the cans along the said way, and means for adjusting the solder applying means and the chain vertically to suit cans of different sizes, substantially as described.

9. In combination in a can soldering machine, means for moving the cans continuously past the solder station, means for preheating the cans, solder feeding means, a guide tube for the solder pivotally supported and thereby having movement by the contact of the solder with the moving can to follow the movement of said can, means for returning said tube to normal position, and an adjustable stop for determining said normal position, substantially as described.

10. In combination in a can soldering machine, means for feeding the solder comprising a frictioned driving device, a feed wheel, a toothed wheel connected with the feed wheel, a detent for arresting the toothed wheel, said toothed wheel being removable and interchangeable with toothed wheels having differently spaced teeth to suit the cans of different sizes or different periods of solder feeding, substantially as described.

11. In combination in a can soldering machine, means for moving the cans and solder feeding means comprising a solder feed wheel, a toothed wheel connected therewith, a friction drive for the toothed wheel, and a detent for controlling the toothed wheel, said toothed wheel being formed in segments which are adapted to be removed and replaced by other segments having differently spaced teeth, substantially as described.

12. In combination, means for moving the cans past the solder feeding point, a shaft extending parallel with the line of travel of the cans, a plurality of soldering units carried by the said shaft, means for supporting and adjusting the said shaft vertically toward and from the line of travel of the cans, and means for driving the said shaft, substantially as described.

13. In combination in a can soldering machine, a series of soldering units, means for moving the cans past the said units in succession to receive solder therefrom, and means whereby the units may be set farther apart or closer to each other to suit cans of different sizes, substantially as described.

14. In combination in a can soldering machine, means for giving the cans a traveling movement, a rotary shaft extending parallel with the direction of movement of said cans, a plurality of soldering units thereon, and means for adjusting the units along the shaft and for adjusting the shaft vertically, substantially as described.

15. In combination, in a can soldering machine, means for moving the cans continuously past the solder station, means for preheating the cans, a guide tube for the solder pivotally supported and thereby having movement by the contact of the solder with the continuously moving can to follow the movement of said can, and an adjustable stop for determining the normal position of the solder feed tube, substantially as described.

In testimony whereof, I affix my signature in presence of two witnesses.

GEO. H. STEWART.

Witnesses:
E. W. BRENKIN,
E. G. HOWELL.